(12) United States Patent
D'Eon

(10) Patent No.: US 7,347,155 B2
(45) Date of Patent: Mar. 25, 2008

(54) SLIDING WINDOW ARRANGEMENT

(75) Inventor: Anthony D'Eon, Lower West Pubnico (CA)

(73) Assignee: Marinelite Windows Limited, Nova Scotia (CA)

( * ) Notice: Subject to any disclaimer, the term of this patent is extended or adjusted under 35 U.S.C. 154(b) by 0 days.

(21) Appl. No.: 11/393,729

(22) Filed: Mar. 31, 2006

(65) Prior Publication Data
US 2007/0227430 A1    Oct. 4, 2007

(51) Int. Cl.
*B63B 19/00*    (2006.01)
(52) U.S. Cl. .................................... 114/173
(58) Field of Classification Search ............... 114/173
See application file for complete search history.

(56) References Cited
U.S. PATENT DOCUMENTS

| | | | |
|---|---|---|---|
| 3,845,599 A | 11/1974 | Jolly | |
| 4,003,171 A | 1/1977 | Mitchell | |
| 4,095,640 A | 6/1978 | Beckerer, Jr. | |
| 5,887,387 A | 3/1999 | Dallaire | |
| 5,890,331 A | 4/1999 | Hope | |
| 6,098,355 A * | 8/2000 | Li | ............................ 52/212 |
| 6,357,186 B1 | 3/2002 | Gould | |

* cited by examiner

*Primary Examiner*—Stephen Avila
(74) *Attorney, Agent, or Firm*—Nixon & Vanderhye P.C.

(57) ABSTRACT

A sliding window for use in an opening in a supporting structure. The window comprises a plurality of glazing materials, an interior trim ring, and a housing having a plurality of tracks and at least one drain passage connecting each track to a surface on the housing. The drain passages are positioned downwardly from each track through the housing to a position on the surface of housing which is in fluid communication with an exterior environment. The components that comprise the window frame that holds the glazing materials can be economically produced from a unitary blank. The vertical orientation of the drain passages limits the possibility that the passages will become blocked, and thus unable to drain the water from the tracks. Furthermore, each drain passage connects the track directly to the exterior environment to avoid the possibility of one drain passage becoming blocked and urging water back into another track.

18 Claims, 4 Drawing Sheets

SLIDING WINDOW ARRANGEMENT

FIELD OF INVENTION

The present invention relates generally to windows, and more specifically to sliding windows for use in an opening in a supporting structure, such as a wall of a vehicle, an article of heavy equipment or stationary structure.

BACKGROUND OF THE INVENTION

Accumulation of moisture in the tracks of sliding windows and the removal thereof has long been a source of intense investigation, particularly with regard to sliding windows installed on buildings. In order to maintain the desired profile of the window with respect to the facade of the building, it is desirable to have the window either flush with the rest of the exterior of the building or offset towards the interior of the building. Accordingly, most sliding window drainage systems remove water from the track closest to the interior of the building by first having the water drain vertically from the track and then travel substantially horizontally where the drainage system converges with the water flowing from the track closest to the exterior of the building. The water combined from both tracks typically empties from the sill through a common exit port. Unless one-way valves or other means for preventing reverse flow into the drainage system are placed within the system, these windows will be prone to leakage and/or blockage.

Numerous unique systems have been proposed which seek to limit the possibility of water being pushed back through the drainage system into the interior of the building. For example, Dallaire (U.S. Pat. No. 5,887,387) describes a drainage system having a flap covering the drainage aperture that is urged open when water flows from the tracks outwardly to the environment. However, the flap cannot be pushed in the other direction allowing air or water to enter the tracks from the outside environment. In addition, vents are provided within the system to assist in expelling the water from the tracks.

Gould (Canadian Patent Application No. 2,319,400) describes a one-way valve that is positioned on the window frame near the interior of the building. The valve permits the outflow of air and water from the interior of the building when the pressure in the building is higher than the outside pressure and prevents the flow of air into the building when the pressure outside is higher than the pressure in the interior of the building.

Jolly (U.S. Pat. No. 3,845,599) describes a window drain valve that uses a cylindrical rod that rises and falls in accordance with the level of water in the window frame. When the maximum amount of water has accumulated in the interior of the window frame the cylindrical rod is urged against an aperture in the track of the window, thus preventing water from entering back into the track.

Drainage systems for patio doors and fixed windows positioned in a door have also been proposed. For example, Hope (U.S. Pat. No. 5,890,331) describes a drainage tube that is inserted into the support frame for a window positioned in a door. The tube is used to connect the window receiving pocket within the support frame to the exterior environment. The system described by Hope is particularly directed to fixed windows accommodated in doors having a single window receiving pocket and does not address the problem associated with draining two or more window receiving pockets or tracks. Therefore, the system described by Hope could not be readily adapted for use with sliding windows having two or more tracks.

The application of sliding windows on structures that are capable of movement, such as boats and other vehicles, presents additional challenges in terms of trying to remove moisture that accumulates in the tracks of the window. The movement of the vehicle causes air to be channelled down the tracks urging water to rapidly accumulate in the corners of the window. Therefore, a need exists to provide a drainage system for sliding windows on vehicles that is capable of rapidly removing water from the tracks. In addition, a moving vehicle is subject to exposure to airborne debris, which could enter a drainage system and/or passage and block the outflow of water from the window frame. Accordingly it is desirable to have a window drainage system that has separate drainage passages for each track that the glazing material moves along, which are devoid of a horizontal sections and whereby the drain passages are as short as possible to ensure that any debris that enters the passage will quickly be dispersed by the outside air moving across the exterior opening of the passage.

SUMMARY OF THE INVENTION

It is an object of the present invention to provide a sliding window and sliding window frame for use in an opening in a supporting structure that addresses the limitations of the prior art.

The sliding window of the present invention contains drain passages that allow quick and efficient drainage of water that could potentially accumulate in the tracks that accommodate the glazing materials. The vertical orientation of the drain passages limits the possibility that the passages will become blocked, and thus unable to drain the water from the tracks. Furthermore, each drain passage connects the track directly to the exterior environment to avoid the possibility of one drain passage becoming blocked and urging water back into another track.

According to an aspect of the present invention, there is provided a sliding window for use in an opening in a supporting structure, the sliding window comprising: a plurality of glazing materials; a housing having a plurality of tracks dimensioned to receive the plurality of glazing materials and at least one drain passage connecting each track to a surface on the housing; and an interior trim ring for attachment to the housing. The drain passages are positioned downwardly from each track through the housing to a position on the surface of the housing, which is in fluid communication with an exterior environment.

According to a second aspect of the present invention, there is provided a method for producing the window comprising the steps of: extruding a unitary blank comprising the housing and the interior trim ring; extracting the housing and interior trim ring from the unitary blank; attaching the housing to an exterior surface of the supporting surface adjacent to the perimeter of the opening; fastening the interior trim ring to the housing; and positioning the plurality of glazing materials in the plurality of tracks.

According to a third aspect of the present invention there is provided a window frame for use in an opening in a supporting structure, the window frame comprising: a housing having a plurality of tracks dimensioned to receive a plurality of glazing materials and a plurality of drain passages connecting each track to a surface on the housing; and an interior trim ring for attachment to the housing. The drain passages are positioned downwardly from each track through the housing to a position on the surface of the housing, which is in fluid communication with an exterior environment.

According to a fourth aspect of the present invention, there is provided a method for producing the window frame comprising the steps of: extruding a unitary blank comprising the housing and interior trim ring; and extracting the housing and interior trim ring from the unitary blank.

BRIEF DESCRIPTION OF THE DRAWINGS

These and other features of the invention will become more apparent from the following description in which reference is made to the appended drawings wherein.

DETAILED DESCRIPTION OF THE INVENTION

An exemplary example of a sliding window of the present invention is shown in FIGS. 1 to 6. The sliding window is described with reference for use in an opening on a cabin wall of a boat. However, the sliding window could be adapted for use on most supporting structures such as the walls of vehicles, including cars, vans, trucks, trailers, recreational vehicles, and airplanes. In addition, the window may be installed on any articles of heavy equipment, such as cranes and excavators, or stationary structures, such as toll booths or workstations.

Figure 3:
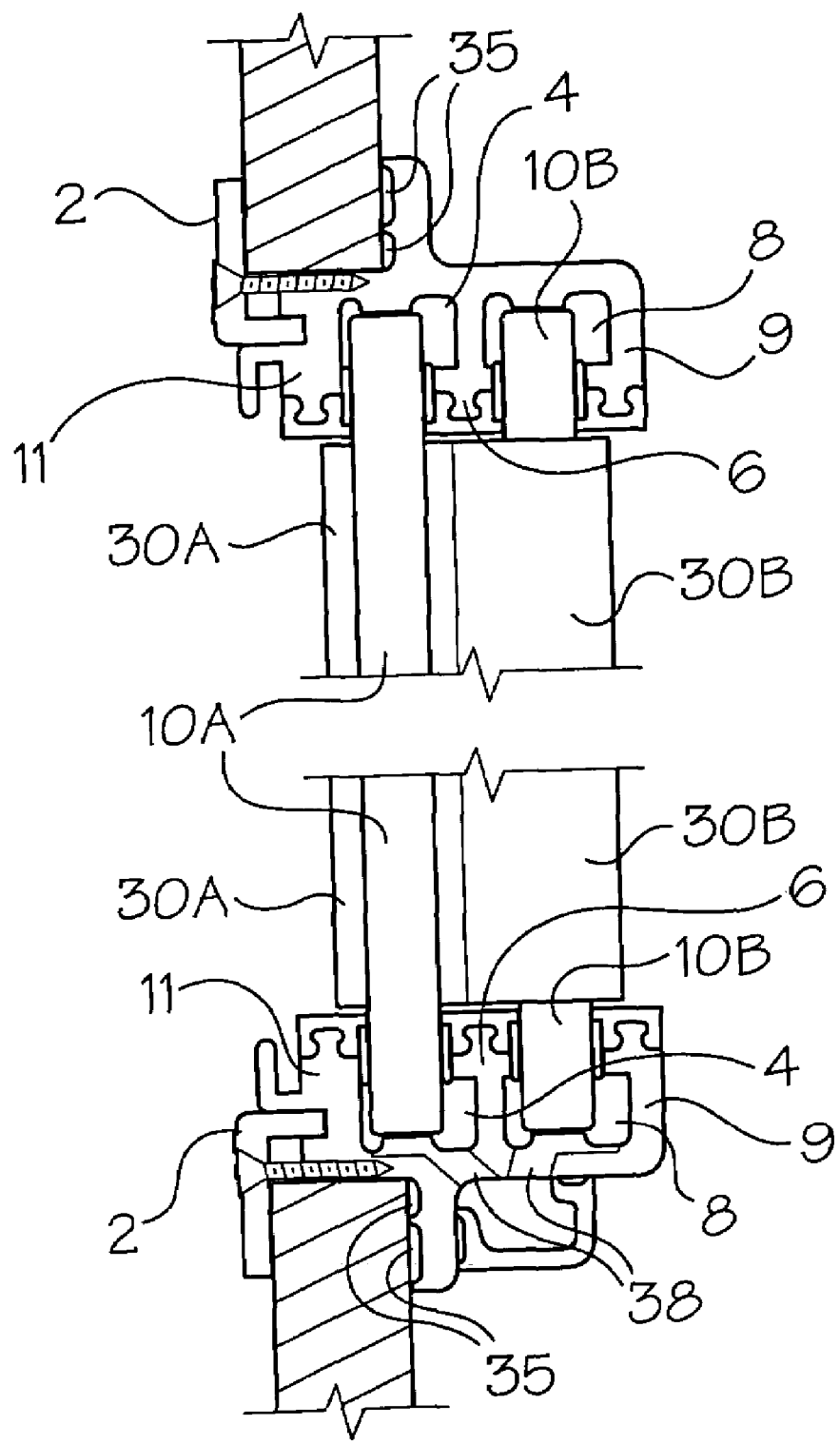
FIG. 3 is a cross-sectional view of a window according to an embodiment of the present invention.

The window (40) generally comprises a plurality of glazing materials (10A, 10B), a housing (13) and an interior trim ring (2) (FIG. 3). The housing (13) having a plurality of tracks (4, 8) and a plurality of drain passages (38) connecting each track (4, 8) to a surface on the housing (13).

The glazing materials (10A, 10B) accommodated in the window frame of the present invention can be formed from any translucent or semi-translucent material. The glazing materials (10A, 10B) are generally made from laminated or tempered glass, polycarbonate or acrylic, which are all able to withstand impact from waves and debris churned up by the sea. As shown in FIG. 3, typically two panes of glazing material (10A, 10B) are provided in the sliding window of the present invention. Each pane of glazing material (10A, 10B) would be provided in a separate track (4, 8). However, certain speciality applications may require more or less panes of glazing material to be provided. For example, it would be possible to fixed two panes of glazing material at either end of one channel and provide a third pane of glazing material in the second channel, which would be free to slide across the opening provided between the two fixed panes of glazing material. Commonly, the glazing materials (10A, 10B) are provided in either a single-sliding arrangement or a double-sliding arrangement.

Tracks (4, 8) are provided in the housing (13) to hold the glazing materials (10A, 10B) in place within the window (40). The tracks (4, 8) are provided along the top and bottom of the housing (13) allowing the glazing materials (10A, 10B) to slide back and forth across the opening in the cabin wall (32). The gap formed between the two panes of glazing material is essentially sealed by providing end pieces (30A, 30B) along the edges of glazing materials (10A, 10B). In the example shown in FIG. 3, two tracks (4, 8) are provided to accommodate two panes of glazing material (10A, 10B). The tracks (4, 8) are generally U-shaped and arranged so that they are divided by a common wall or vertical portion (6). Exterior wall (9) forms the other wall of track (8) and interior wall (11) forms the opposite wall for track (4). Each of the walls (6, 9, 11) provides stability to the glazing materials (10A, 10B) and prevents lateral movement thereof. Generally, each wall (6, 9, 11) is capped with a weatherstrip (12) that is flexible enough to allow the glazing material to be inserted and removed from the track, and which is capable of forming an essentially weather-tight seal against the glazing material. In an alternate embodiment, each wall (6, 9, 11) is provided with a male connector (50) that corresponds with a female connector provided on the weatherstrip (12). The weatherstrips (12) are then snapped onto the wall, which provides a removable weatherstrip (12) that is easily replaced when damaged or after deterioration by ultra-violet radiation.

The housing (13) further comprises drain passages (38) connecting each track (4, 8) to a surface on the housing (13). Each track (4,8) is connected to a surface of housing (13), which is in fluid communication with the exterior environment, by at least one drain passage (38). The drain passages (38) are oriented downwardly and substantially vertically from each track (4, 8) to the exterior surface of the housing (13). Each drain passage (38) directly links the track (4, 8) to the exterior environment, without making contact with additional drain passages (38). Accordingly the window (40) will be offset from the plane defined by the surface of the wall (32) of the vehicle. The vertical orientation of the drain passages (38) limits the possibility of the drain passage (38) becoming clogged by leaves or other debris and will ensure that any water accumulated in the track will be drained. Moreover, as the vehicle moves the airflow across the end of the drain passage (38), which is in fluid communication with the exterior environment, will provide a near continuous cleaning action for each passage (38), thus further preventing accumulation of debris within the passage (38). In addition, as air flows across the exterior opening of the drain passage (38) water accumulated therein will be quickly expelled, thus limiting the possibility of the windows (40) leaking even during the most harsh conditions.

Figure 4A:
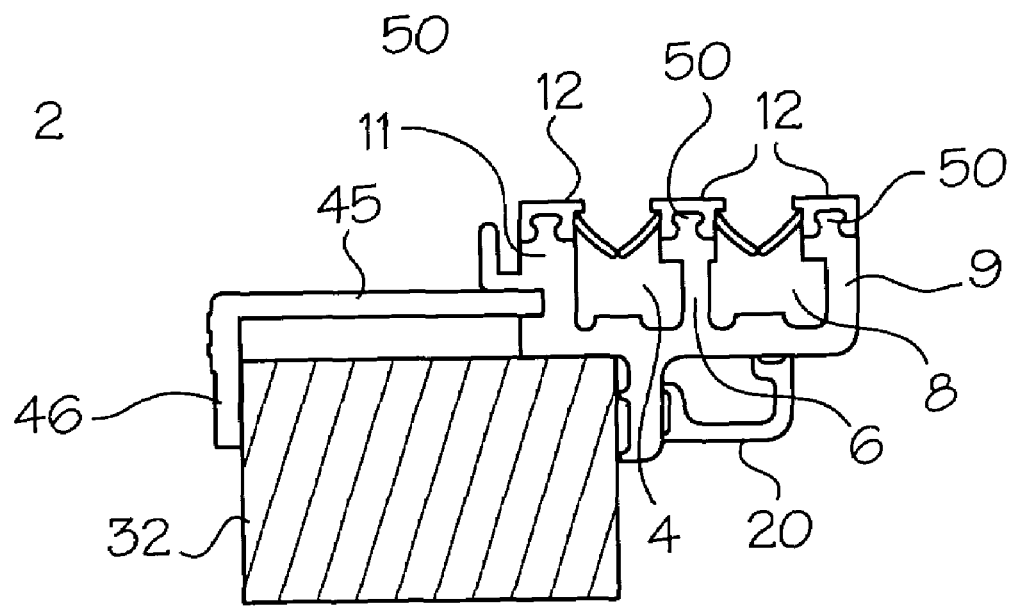
FIG. 4A is a cross-sectional view of the housing and interior trim ring according to an embodiment of the present invention.
Figure 4B:
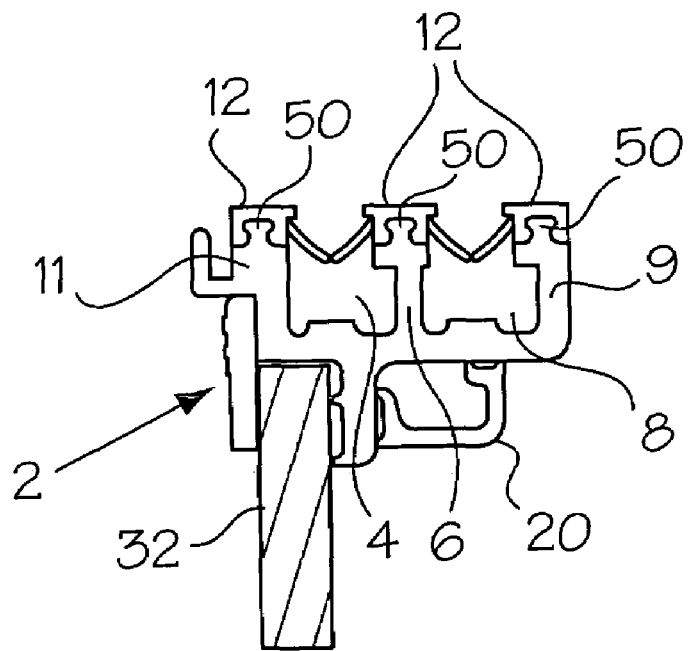
FIG. 4B is a cross-sectional view of the housing and interior trim ring according to another embodiment of the present invention.
Figure 5:
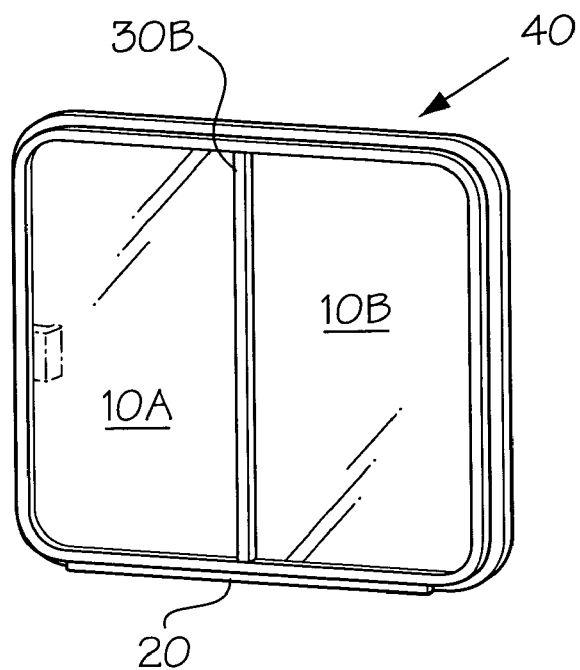
FIG. 5 is an exterior perspective view of a window according to an embodiment of the present invention.

In an alternate embodiment of the window (40) a cover (20) is provided over the drain passage (38) openings on the surface of the housing (13) (FIG. 4A and 4B). The cover (20) is typically provided as an open-ended elongated channel that spans the width of the window (40) and is attached to the housing (13) by either a sealant or fasteners (FIG. 5). The cover (20) is purposed to prevent water, debris and wind from entering into the drain passages (38) from the environment and either leaking into the cabin of the boat or clogging the drain passage (38). In addition, the open ends of the cover (20) funnels air past the drain passage (38) openings, thus permitting more efficient clearing of the drain passages (38) and the water accumulated therein.

Figure 2:
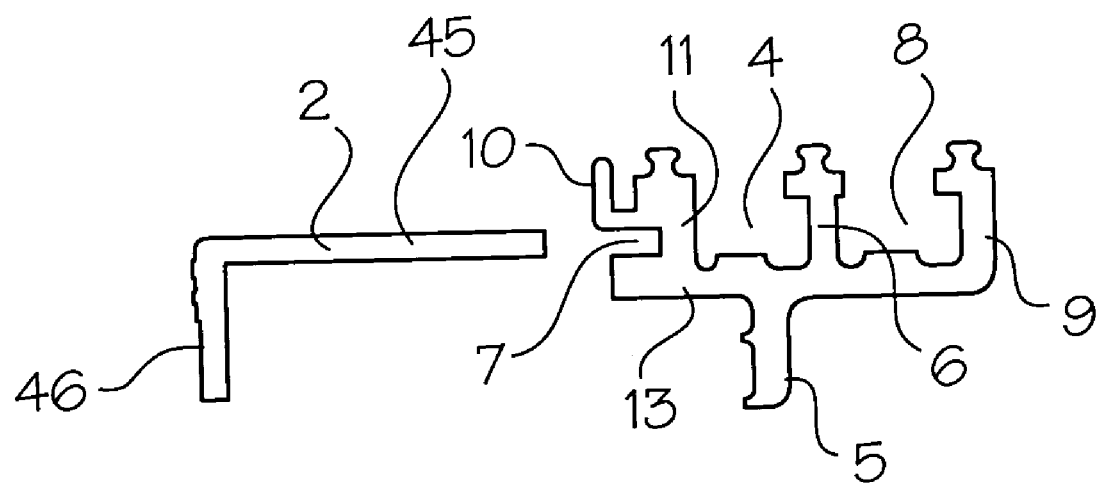
FIG. 2 is a cross-sectional view of the individual components of a window frame according to an embodiment of the present invention.

The interior trim ring (2) comprises a casement section (46) and an extension section (45) (FIG. 2). The casement section (46) is positioned substantially parallel to the glazing materials (10A, 10B) and generally covers the gap between the housing (13) and the edge of the opening in the cabin wall (32). The extension section (45) is positioned substantially perpendicular to the casement section (46) and bridges the gap between the casement section (46) of the interior trim ring (2) and the housing (13). The free end of the extension section (45) can be inserted into a recess (7) provided in the housing (13) in order to provide a finished appearance to the window (40). In addition, the length of the extension section (45) can be modified to accommodate boats with cabin walls (32) of various thickness (FIGS. 4A and 4B). For boats with cabin walls (32) that have some curvature to them, the radius of the curve can be scribed onto the extension section (45) and the extension section subsequently trimmed to allow the interior trim ring (2) to rest flush against the cabin wall (32). Accordingly, from inside the cabin of the boat, the window will appear as if it were custom fabricated, when in fact the window frame was fabricated from a standard blank (1) that can be used for a wide variety of windows.

Figure 1:
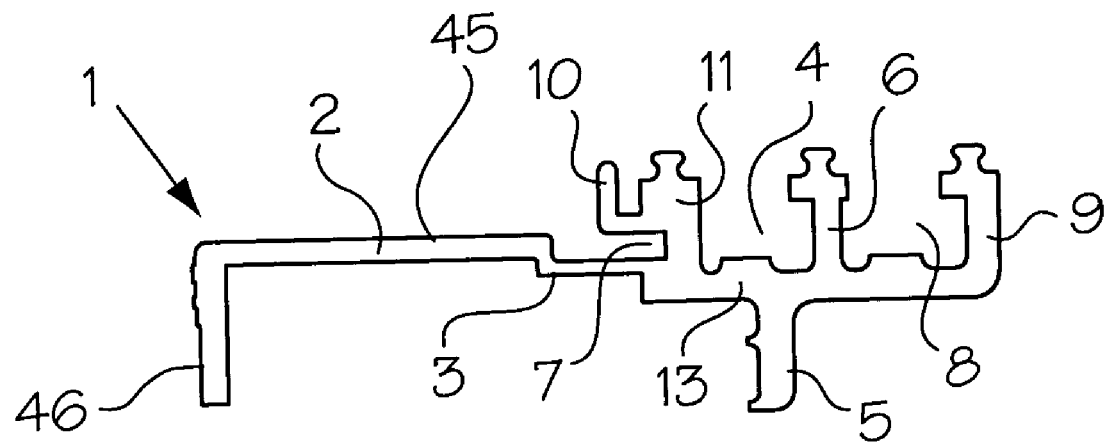
FIG. 1 is a cross-sectional view of a unitary blank according to an embodiment of the present invention.

The window frame can be fabricated starting from a unitary blank (1) having the housing (13) and interior trim ring (2) formed therein (FIG. 1). Generally, the unitary blank (1) is produced from the process of plastic extrusion molding using polyvinyl chloride, which will eventually be used to produce a window frame that is inexpensive and able to withstand environmental factors. The unitary blank (1) and resulting window frame can also be manufactured from more expensive materials such as aluminum, brass, other plastics, in addition to other corrosion-resistant metals. Once the blank (1) is produced, it can be shaped in accordance with the shape of the opening in the cabin wall (32) in which it will be eventually installed.

The individual components of the window frame are cut from the unitary blank (1) depending on the specific requirements for the window (40) (FIG. 2). Connector (3) is cut near the section of the blank (1) that will eventually form the housing (13) and along the portion of the blank (1) that eventually forms the extension section (45) of the interior trim ring (2). The amount that needs to be cut from the extension section (45) will depend on the thickness of the cabin wall (32). For example, if the window (40) is to be installed on a relative thin cabin wall (32) a greater length of the extension section (45) can be cut away, then if the window (40) were to be installed on a relatively thick cabin wall (32). Alternatively, the connector (3) can be cut at the junction between the extension section (45) and the connector (3), and the extension section (3) can be later trimmed in accordance with the specific requirements of the cabin wall (32) in which the window is to be installed in.

Figure 6:
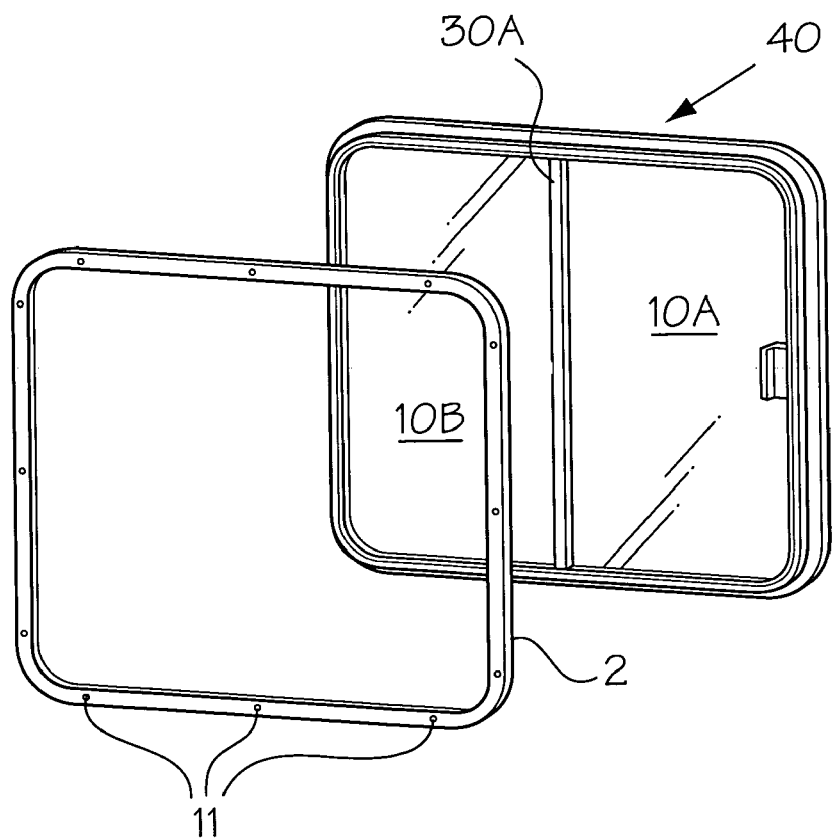
FIG. 6 is an interior perspective view of a window according to an embodiment of the present invention.

The individual components of the window frame are assembled to form the window (40) shown in FIGS. 5 and 6. The housing (13) is adhered to the exterior of the cabin wall (32) by first applying a sealant (35) to the inner surface of exterior trim member (5) and then seating the housing (13) in the opening in the cabin wall (32). Optionally, sealant can be applied to the overlap between the housing (13) and the opening in the cabin wall (32) in order to provide additional strength to the bond between the window frame and the opening. In light of the fact that the sealant (35) is protected from the damaging effects of ultra-violet radiation by the housing (13) any structural sealant can be used to attach the housing (13) to the cabin wall (32). The housing (13) can either extend the full thickness of the cabin wall (32) (FIG. 4B) or can extend over only a portion of the thickness of the cabin wall (32) (FIG. 4A). The interior trim ring (2) is attached to the housing (13) by first inserting the open end of the extension section (42) into the recess (7) of the housing (13). The interior trim ring (2) is clamped against the interior surface of the cabin wall (32) by fastening the interior trim ring (2) to the housing (13). Optionally, a holder (10) can be provided to allow for a screen frame to be placed over the window. Whether the window (40) is a single or double-sliding window, will dictate when the glazing materials are inserted into the window frame (i.e. before the frame is seated in the opening, or after the frame has been secured in the opening).

The present invention has been described with regard to preferred embodiments. However, it will be obvious to persons skilled in the art that a number of variations and modifications can be made without departing from the scope of the invention as described herein.

I claim:

1. A sliding window for use in an opening in a supporting structure, the sliding window comprising:
    a plurality of glazing materials;
    a housing having a plurality of tracks dimensioned to receive the plurality of glazing materials and at least one drain passage connecting each track to a surface on the housing; and
    an interior trim ring for attachment to the housing,
    the drain passages being positioned downwardly from each track through the housing to a position on the surface of the housing, which is in fluid communication with an exterior environment,
    the plurality of tracks being U-shaped and arranged adjacent and parallel to one another, with each vertical portion of the track having a weather strip attached to the top thereof; and
    the weather strip being attached to the vertical portion of the track by a female connector provided on the weather strip and a corresponding male connector provided on the top of the vertical portion of the track.

2. The sliding window according to claim 1, further comprising an elongated channel positioned on an exterior surface of the housing and surrounding the end of the drain passage positioned on the surface of the housing.

3. The sliding window according to claim 1, wherein the housing is attached to the supporting structure by a sealant.

4. The sliding window according to claim 1, wherein the interior trim ring comprises a casement section positioned substantially parallel to the glazing materials; and an extension section positioned substantially perpendicular to the casement section.

5. The sliding window according to claim 4, wherein the extension section is adjustable for bridging a gap formed between the casement section and the housing when the window is positioned in the opening.

6. A method for producing a sliding window for use in an opening in a supporting structure, the sliding window comprising a plurality of glazing materials; a housing having a plurality of tracks dimensioned to receive the plurality of glazing materials and at least one drain passage connecting each track to a surface on the housing; and an interior trim ring for attachment to the housing,
    wherein the drain passages are positioned downwardly from each track through the housing to a position on the surface of the housing, which is in fluid communication with an exterior environment, the method comprising the steps of:

extruding a unitary blank comprising the housing and the interior trim ring;

extracting the housing and interior trim ring from the unitary blank;

attaching the housing to an exterior surface of the wall of the vehicle adjacent to the perimeter of the opening in the wall;

fastening the interior trim ring to the housing; and positioning the plurality of glazing materials in the plurality of tracks.

7. The method according to claim 6, wherein the housing and interior trim ring are connected by a removable connector element within the unitary blank.

8. The method according to claim 6, wherein the housing is attached to the supporting structure by a sealant.

9. The method according to claim 6, wherein the interior trim ring comprises: a casement section positioned substantially parallel to the glazing materials; and an extension section positioned substantially perpendicular to the casement section.

10. The method according to claim 9, further comprising the step of adjusting the length of the extension section prior to fastening the interior trim ring to the housing.

11. A window frame for use in an opening in a supporting structure, the window frame comprising:

a housing having a plurality of tracks dimensioned to receive a plurality of glazing materials and at least one drain passage connecting each track to a surface on the housing; and an interior trim ring for attachment to the housing, the drain passages being positioned downwardly from each track through the housing to a position on the surface of the housing which is in fluid communication with an exterior environment, the plurality of tracks being U-shaped and arranged adjacent and parallel to one another, with each vertical portion of the track having a weather strip attached to the top thereof, and the weather strip being attached to the vertical portion of the track by a female connector provided on the weather strip and a corresponding male connector provided on the top of the vertical portion of the track.

12. The window frame according to claim 11, further comprising an elongated channel positioned on an exterior surface of the housing and surrounding the end of the drain passage positioned on the surface of the housing.

13. The window frame according to claim 11, wherein the housing is attached to the supporting structure by a sealant.

14. The window frame according to claim 11, wherein the interior trim ring comprises: a casement section positioned substantially parallel to the glazing materials; and an extension section positioned substantially perpendicular to the casement section.

15. The window frame according to claim 14, wherein the extension section is adjustable for bridging a gap formed between the casement section and the housing when the window is positioned in the opening.

16. The window according to claim 1, wherein the supporting surface is a wall in a boat.

17. A sliding window for use in an opening in a supporting structure, the sliding window comprising:

a plurality of glazing materials;

a housing having a plurality of tracks dimensioned to receive the plurality of glazing materials and at least one drain passage connecting each track to a surface on the housing; and an interior trim ring for attachment to the housing, the drain passages being positioned downwardly from each track through the housing to a position on the surface of the housing which is in fluid communication with an exterior environment, the interior trim ring comprising a casement section positioned substantially parallel to the glazing materials and an extension section positioned substantially perpendicular to the casement section, the extension section being adjustable for bridging a gap formed between the casement section and the housing when the window is positioned in the opening.

18. A window frame for use in an opening in a supporting structure, the window frame comprising:

a housing having a plurality of tracks dimensioned to receive a plurality of glazing materials and at least one drain passage connecting each track to a surface on the housing; and an interior trim ring for attachment to the housing, the drain passages being positioned downwardly from each track through the housing to a position on the surface of the housing which is in fluid communication with an exterior environment, the interior trim ring comprising a casement section positioned substantially parallel to the glazing materials and an extension section positioned substantially perpendicular to the casement section, the extension section being adjustable for bridging a gap formed between the casement section and the housing when the window is positioned in the opening.

* * * * *